United States Patent
Harmes V et al.

(10) Patent No.: US 10,926,672 B2
(45) Date of Patent: Feb. 23, 2021

(54) CHILD RESTRAINT SYSTEM AND CHILD RESTRAINT CARRIER THEREOF

(71) Applicant: Wonderland Switzerland AG, Steinhausen (CH)

(72) Inventors: Clyde S. Harmes V, Mohnton, PA (US); James M. F. Hutchinson, Mohnton, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/565,514

(22) Filed: Sep. 10, 2019

(65) Prior Publication Data

US 2020/0079250 A1 Mar. 12, 2020

Related U.S. Application Data

(60) Provisional application No. 62/730,314, filed on Sep. 12, 2018.

(51) Int. Cl.
*B60N 2/28* (2006.01)
*B60N 2/26* (2006.01)
*B60N 2/815* (2018.01)

(52) U.S. Cl.
CPC .......... *B60N 2/2821* (2013.01); *B60N 2/265* (2013.01); *B60N 2/2812* (2013.01); *B60N 2/2851* (2013.01); *B60N 2/815* (2018.02); *B60N 2/2806* (2013.01); *B60N 2/2845* (2013.01)

(58) Field of Classification Search
CPC .. B60N 2/2851; B60N 2/2821; B60N 2/2812; B60N 2/2842; B60N 2/2845; B60N 2/265; B60N 2/2806; B60N 2/2863; B60N 2/28; B60N 2/809; B60N 2/812; B60N 2/815; B60R 22/12; B60R 22/105
USPC .................................................... 297/256.16
See application file for complete search history.

(56) References Cited

U.S. PATENT DOCUMENTS

| | | | |
|---|---|---|---|
| 6,626,493 B2 * | 9/2003 | Kain | B60N 2/2812 297/250.1 |
| 7,207,628 B2 * | 4/2007 | Eros | B60N 2/2821 297/256.13 |
| 7,926,874 B2 | 4/2011 | Hendry | |
| 7,988,230 B2 | 8/2011 | Heisey | |
| 8,573,695 B2 | 11/2013 | Van Geer | |
| 8,845,021 B2 * | 9/2014 | Hou | B60N 2/2872 297/250.1 |
| 8,973,991 B2 | 3/2015 | Wuerstl | |

(Continued)

*Primary Examiner* — Milton Nelson, Jr.
(74) *Attorney, Agent, or Firm* — Winston Hsu

(57) ABSTRACT

The present invention discloses a child restraint system including a child restraint base and a child restraint carrier. The child restraint carrier is detachably installed on the child restraint base. The child restraint carrier includes a seat body, a headrest and a harness assembly. At least one first slot is formed on the seat body. The headrest is movably installed on the seat body. At least one second slot is formed on the headrest. The harness assembly includes at least one shoulder strap. The at least one shoulder strap slidably passes through the at least one first slot and the at least one second slot, and a height of the at least one shoulder strap is adjusted by movement of the headrest relative to the seat body when the headrest moves relative to the seat body. Therefore, the present invention has an advantage of easy adjustment.

17 Claims, 7 Drawing Sheets

(56) References Cited

U.S. PATENT DOCUMENTS

| | | | |
|---|---|---|---|
| 8,979,198 B2 * | 3/2015 | Williams | B60N 2/2863 |
| | | | 297/256.1 |
| 9,365,135 B2 | 6/2016 | Carpenter | |
| 10,035,436 B2 | 7/2018 | Zhou | |
| 10,189,381 B2 | 1/2019 | Williams | |
| 2016/0347210 A1 | 12/2016 | Mason | |

* cited by examiner

CHILD RESTRAINT SYSTEM AND CHILD RESTRAINT CARRIER THEREOF

CROSS REFERENCE TO RELATED APPLICATIONS

This application claims the benefit of U.S. Provisional Patent Application No. 62/730,314 filed on Sep. 12, 2018, which are hereby incorporated by reference in its entirety.

BACKGROUND OF THE INVENTION

1. Field of the Invention

The present invention relates to a child product, and more particularly, to a child restraint system with easy adjustment of a shoulder strap and a reclined angle, and a child restraint carrier thereof.

2. Description of the Prior Art

A child restraint system is specifically designed to protect a child from injury or death during a collision of a vehicle. The conventional child restraint system usually includes a base portion and a seat portion detachably installed on the base portion. When the conventional child restraint system is secured on a vehicle by a lower anchor or a vehicle belt, the base portion must be adjusted to a proper reclined angle. However, access to a recline actuator for adjusting the reclined angle of the base portion is often obstructed by a seat back of the vehicle. The lower anchor or the vehicle belt has to be disconnected from the conventional child restraint system in order for adjustment of the reclined angle of the base portion. Furthermore, a position of a shoulder harness of the seat portion must be adjusted to fit a child. However, an actuator for adjusting the position of the shoulder harness is usually hidden by other components, which requires disassembly of the seat portion for adjustment of the shoulder harness.

SUMMARY OF THE INVENTION

Therefore, it is an objective of the present invention to provide a child restraint system with easy adjustment of a shoulder strap and a reclined angle, and a child restraint carrier thereof.

In order to achieve the aforementioned objective, the present invention discloses a child restraint system including a child restraint base and a child restraint carrier. The child restraint carrier is detachably installed on the child restraint base. The child restraint carrier includes a seat body, a headrest and a harness assembly. At least one first slot is formed on the seat body. The headrest is movably installed on the seat body. At least one second slot is formed on the headrest. The harness assembly includes at least one shoulder strap. The at least one shoulder strap slidably passes through the at least one first slot and the at least one second slot, and a height of the at least one shoulder strap is adjusted by movement of the headrest relative to the seat body when the headrest moves relative to the seat body.

According to an embodiment of the present invention, the child restraint carrier further includes a locking mechanism for allowing or restraining the movement of the headrest relative to the seat body.

According to an embodiment of the present invention, the locking mechanism includes a driving component, a first engaging module and a second engaging module. The driving component is movably disposed on the headrest. The first engaging module is disposed on the seat body. The second engaging module abuts against the driving component for engaging with or disengaging from the first engaging module. The driving component drives the second engaging module to disengage from the first engaging module for allowing the movement of the headrest relative to the seat body when the driving component is operated.

According to an embodiment of the present invention, the driving component includes an inclined protrusion abutting against the second engaging module, and the second engaging module is driven by the inclined protrusion to move away from the first engaging module for disengaging from the first engaging module when the driving component is operated.

According to an embodiment of the present invention, the driving component is partially located between the headrest and the seat body. The first engaging module and the second engaging module are located at a rear side of the seat body away from the headrest, and the inclined protrusion passes through the seat body to abut against the second engaging module.

According to an embodiment of the present invention, the first engaging module includes a guiding component and a plurality of first engaging components. The guiding component is for guiding the movement of the headrest relative to the seat body. The plurality of first engaging components is disposed on the guiding component for engaging with or disengaging from the second engaging module.

According to an embodiment of the present invention, the second engaging module includes a second engaging component, a covering component and a resilient component. The second engaging component abuts against the driving component. The covering component covers the second engaging component. The resilient component abuts between the second engaging component and the covering component to bias the second engaging component to engage with the first engaging module.

According to an embodiment of the present invention, the locking mechanism further includes a recovering component abutting between the driving component and the headrest to recover the driving component when the driving component is released.

According to an embodiment of the present invention, the driving component includes a handle portion exposed out of a top portion of the headrest.

According to an embodiment of the present invention, the locking mechanism further includes a rivet connecting the headrest, the driving component and the second engaging module.

According to an embodiment of the present invention, the child restraint base includes a base body, a reclining foot and an actuator. A notch is formed on a top portion of the base body. The reclining foot is disposed on the base body and movable relative to the base body to adjust a reclined angle of the base body. The actuator is movably disposed on the base body and exposed from the notch. The actuator is switchable between a locking position and a releasing position for allowing or restraining movement of the reclining foot relative to the base body.

In order to achieve the aforementioned objective, the present invention further discloses a child restraint carrier including a seat body, a headrest and a harness assembly. At least one first slot is formed on the seat body. The headrest is movably installed on the seat body. At least one second slot being formed on the headrest. The harness assembly includes at least one shoulder strap. The at least one shoulder strap slidably passes through the at least one first slot and the at least one second slot, and a height of the at least one shoulder strap is adjusted by movement of the headrest relative to the seat body when the headrest moves relative to the seat body.

According to an embodiment of the present invention, the child restraint carrier further includes a locking mechanism for allowing or restraining the movement of the headrest relative to the seat body. The locking mechanism includes a driving component, a first engaging module and a second engaging module. The driving component is movably disposed on the headrest. The first engaging module is disposed on the seat body. The second engaging module abuts against the driving component for engaging with or disengaging from the first engaging module. The driving component drives the second engaging module to disengage from the first engaging module for allowing the movement of the headrest relative to the seat body when the driving component is operated.

According to an embodiment of the present invention, the driving component includes an inclined protrusion abutting against the second engaging module, and the second engaging module is driven by the inclined protrusion to move away from the first engaging module for disengaging from the first engaging module when the driving component is operated.

According to an embodiment of the present invention, the driving component is partially located between the headrest and the seat body. The first engaging module and the second engaging module are located at a rear side of the seat body away from the headrest, and the inclined protrusion passes through the seat body to abut against the second engaging module.

According to an embodiment of the present invention, the first engaging module includes a guiding component and a plurality of first engaging components. The guiding component is for guiding the movement of the headrest relative to the seat body. The plurality of first engaging components is disposed on the guiding component for engaging with or disengaging from the second engaging module.

According to an embodiment of the present invention, the second engaging module includes a second engaging component, a covering component and a resilient component. The second engaging component abuts against the driving component. The covering component covers the second engaging component. The resilient component abuts between the second engaging component and the covering component to bias the second engaging component to engage with the first engaging module.

According to an embodiment of the present invention, the locking mechanism further includes a recovering component abutting between the driving component and the headrest to bias the driving component to recover when the driving component is released.

According to an embodiment of the present invention, the driving component includes a handle portion exposed out of a top portion of the headrest.

According to an embodiment of the present invention, the locking mechanism further includes a rivet connecting the headrest, the driving component and the second engaging module.

In summary, the present invention utilizes the first slot formed on the seat body and the second slot formed on the headrest for allowing the shoulder strap to slidably pass therethrough. Therefore, the height of the shoulder strap is adjusted by movement of the headrest relative to the seat body when the headrest moves relative to the seat body, which requires no disassembly of the child restraint carrier. Furthermore, the present invention further utilizes the notch formed on the top portion of the base body to provide access to the actuator when the child restraint base is installed on a vehicle, which requires no disconnection of a lower anchor or a vehicle belt. Therefore, the child restraint carrier and the child restraint system of the present invention have an advantage of easy adjustment.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
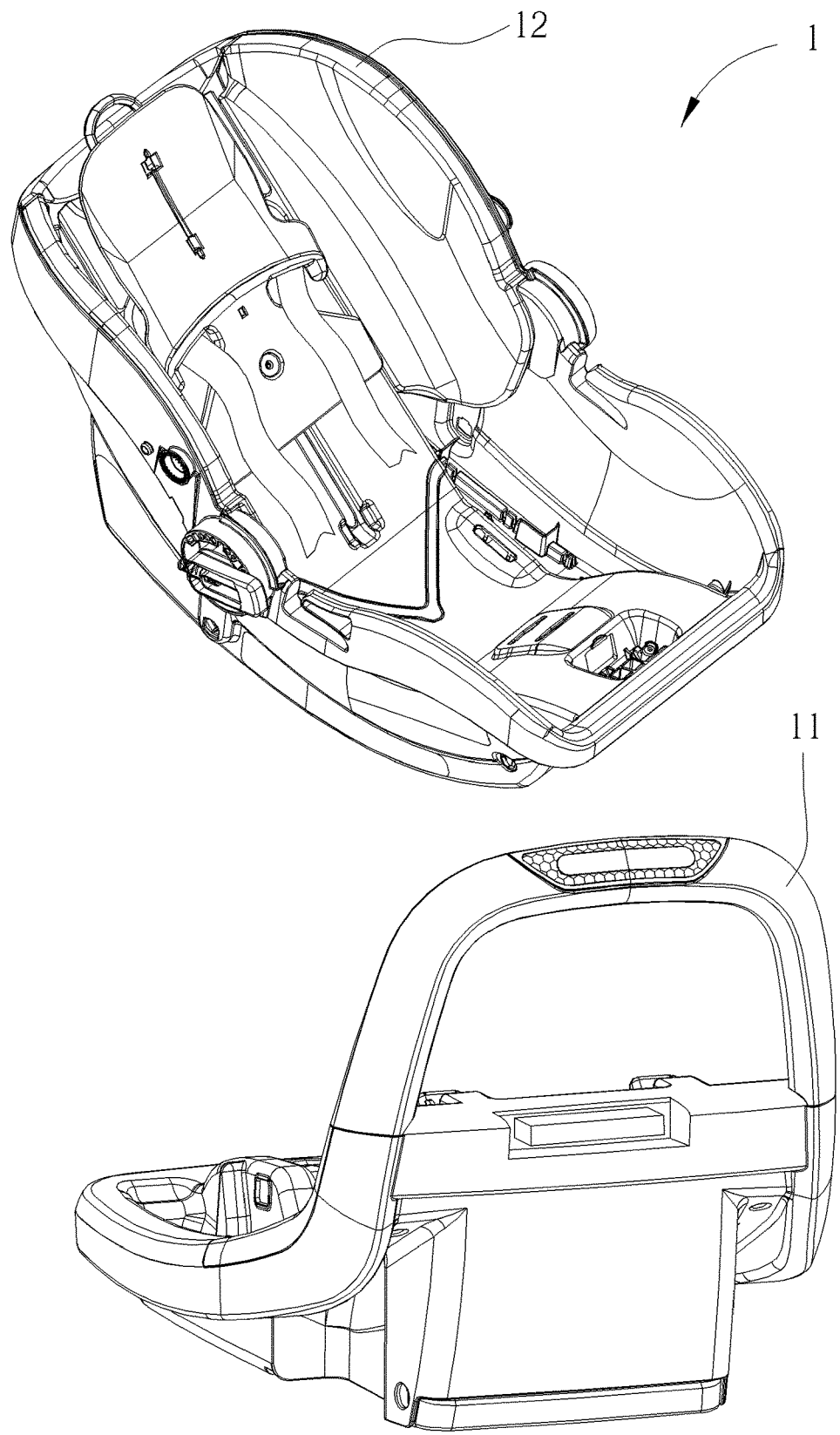
FIG. 1 is an exploded diagram of a child restraint system according to an embodiment of the present invention.

Please refer to FIG. 1. FIG. 1 is an exploded diagram of a child restraint system 1 according to an embodiment of the present invention. As shown in FIG. 1, the child restraint system 1 includes a child restraint base 11 and a child restraint carrier 12. The child restraint carrier 12 can be a child car seat for providing safe and comfort to a child sitting therein. The child restraint carrier 12 is detachably installed on the child restraint base 11. The child restraint base 11 is secured onto a vehicle, which is not shown in the figure, so as to restrain a movement of the child restraint base 11 or the child restraint system 1 during a vehicle accident for achieving a purpose of effectively preventing injury or death of the child. However, the child restraint carrier is not limited to this embodiment. For example, in another embodiment, the child restraint carrier also can be a carriage basket detachably installed on the child restraint base.

Figure 2:
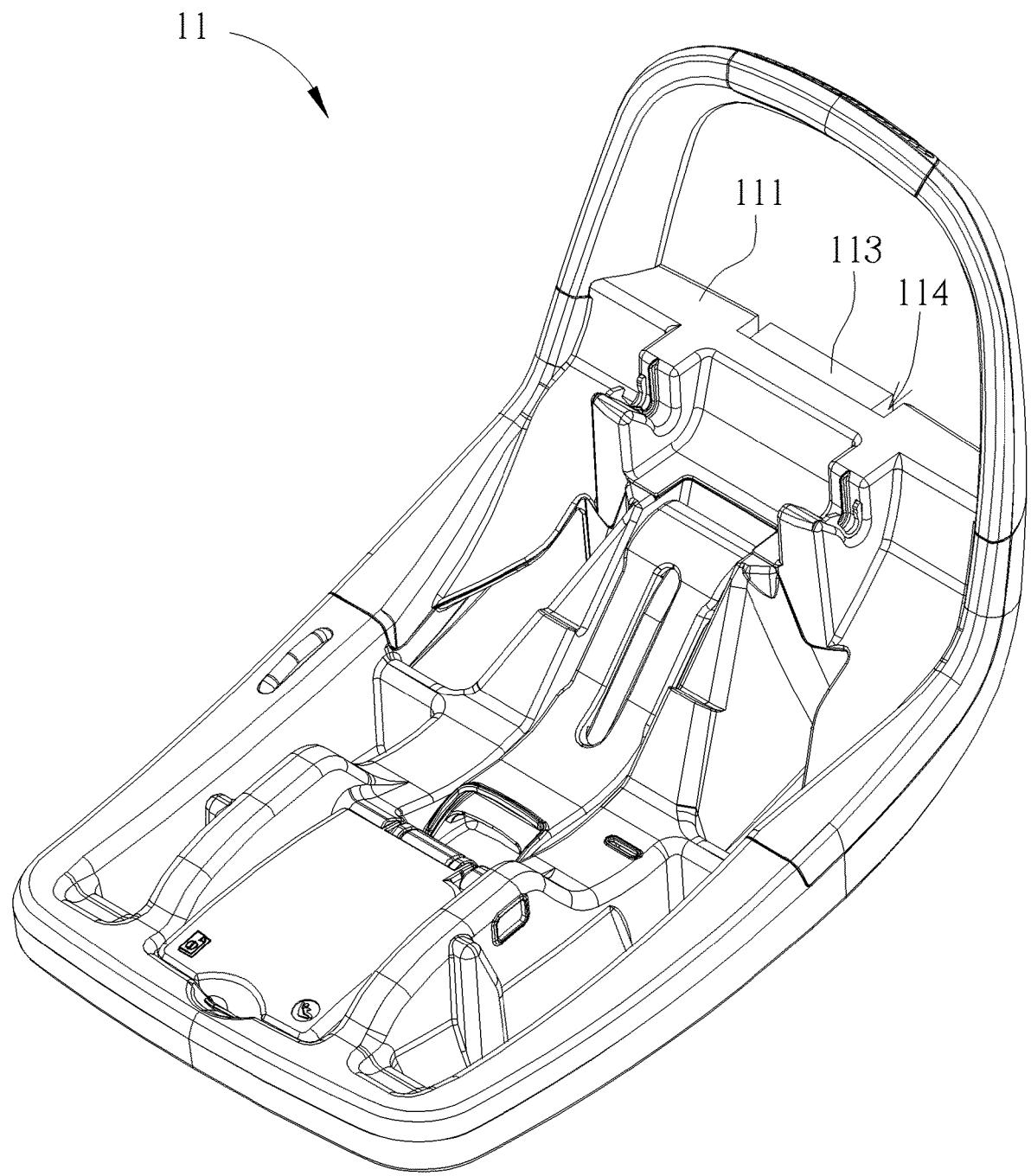
FIG. 2 and FIG. 3 are diagrams of a child restraint base at different views according to the embodiment of the present invention.
Figure 3:
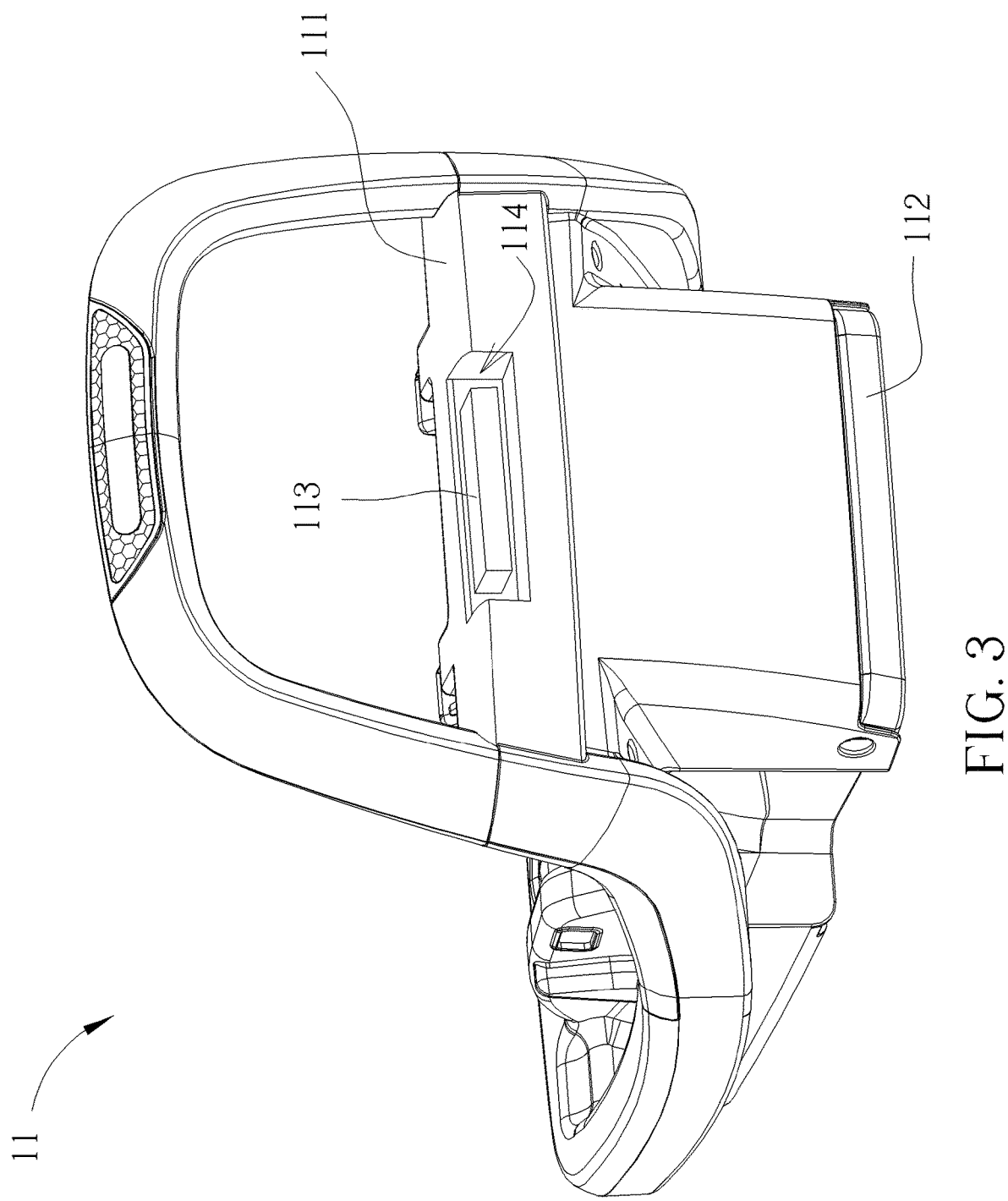

Please refer to FIG. 2 and FIG. 3. FIG. 2 and FIG. 3 are diagrams of the child restraint base 11 at different views according to the embodiment of the present invention. As shown in FIG. 2 and FIG. 3, the child restraint base 11 includes a base body 111, a reclining foot 112 and an actuator 113. A notch 114 is formed on a top portion of the base body 111. Preferably, the notch 114 can be formed on a top edge of the base body 111. The reclining foot 112 is disposed on the base body 111 and movable relative to the base body 111 to adjust a reclined angle of the base body 111. The actuator 113 is movably disposed on the base body 111 and exposed from the notch 114. The actuator 113 is switchable between a locking position and a releasing position for allowing or restraining movement of the reclining foot 112 relative to the base body 111. Since the actuator 113 is exposed out of the notch 114 formed on the top portion of the base body 111, the actuator 113 can be easily accessed by a user from top or front to adjust the reclining foot 112 without disconnecting a lower anchor or a vehicle belt when the child restraint base 11 is secured on a vehicle by the lower anchor or the vehicle belt.

Figure 4:
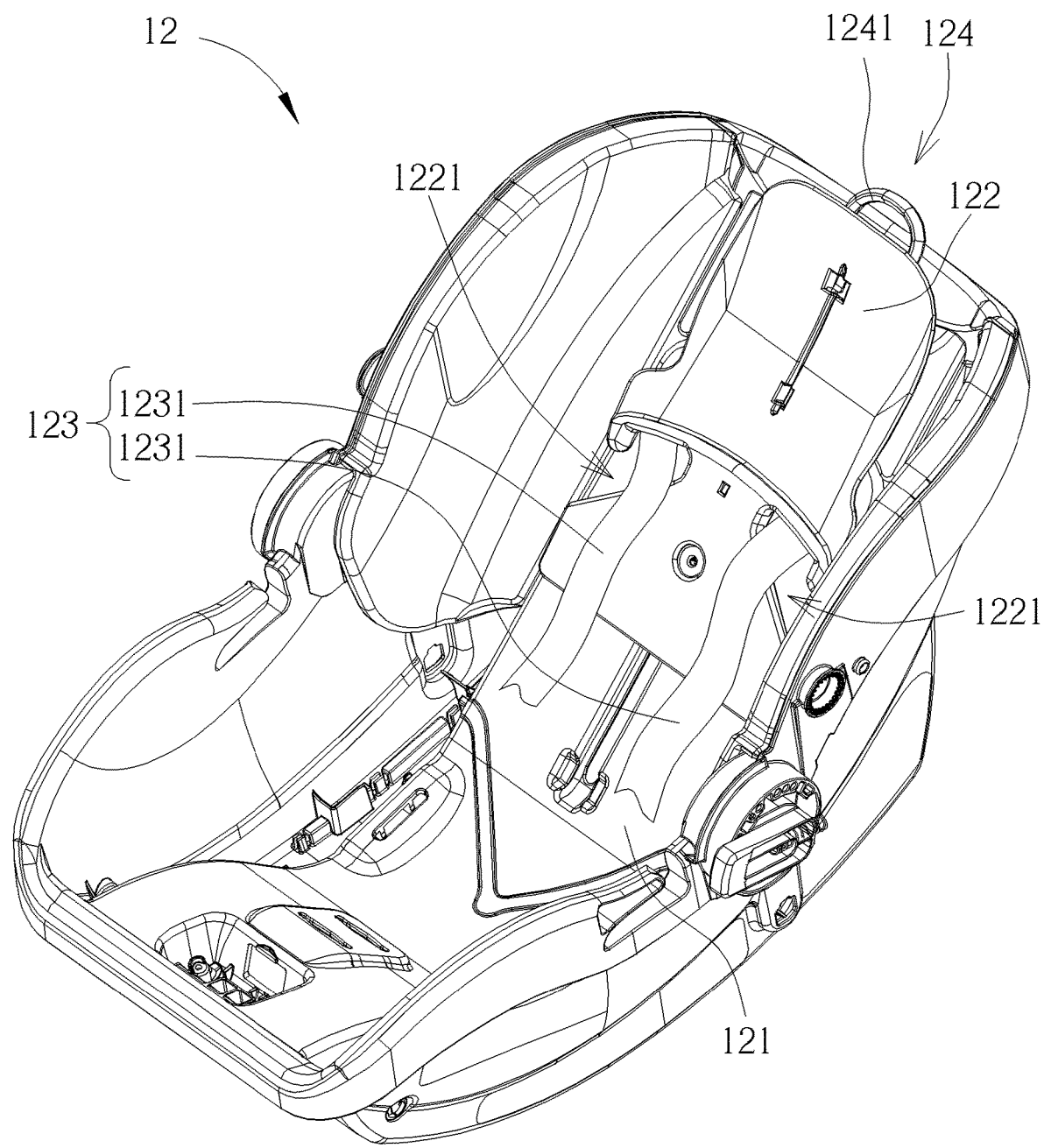
FIG. 4 and FIG. 5 are partial diagrams of a child restraint carrier at different views according to the embodiment of the present invention.
Figure 5:
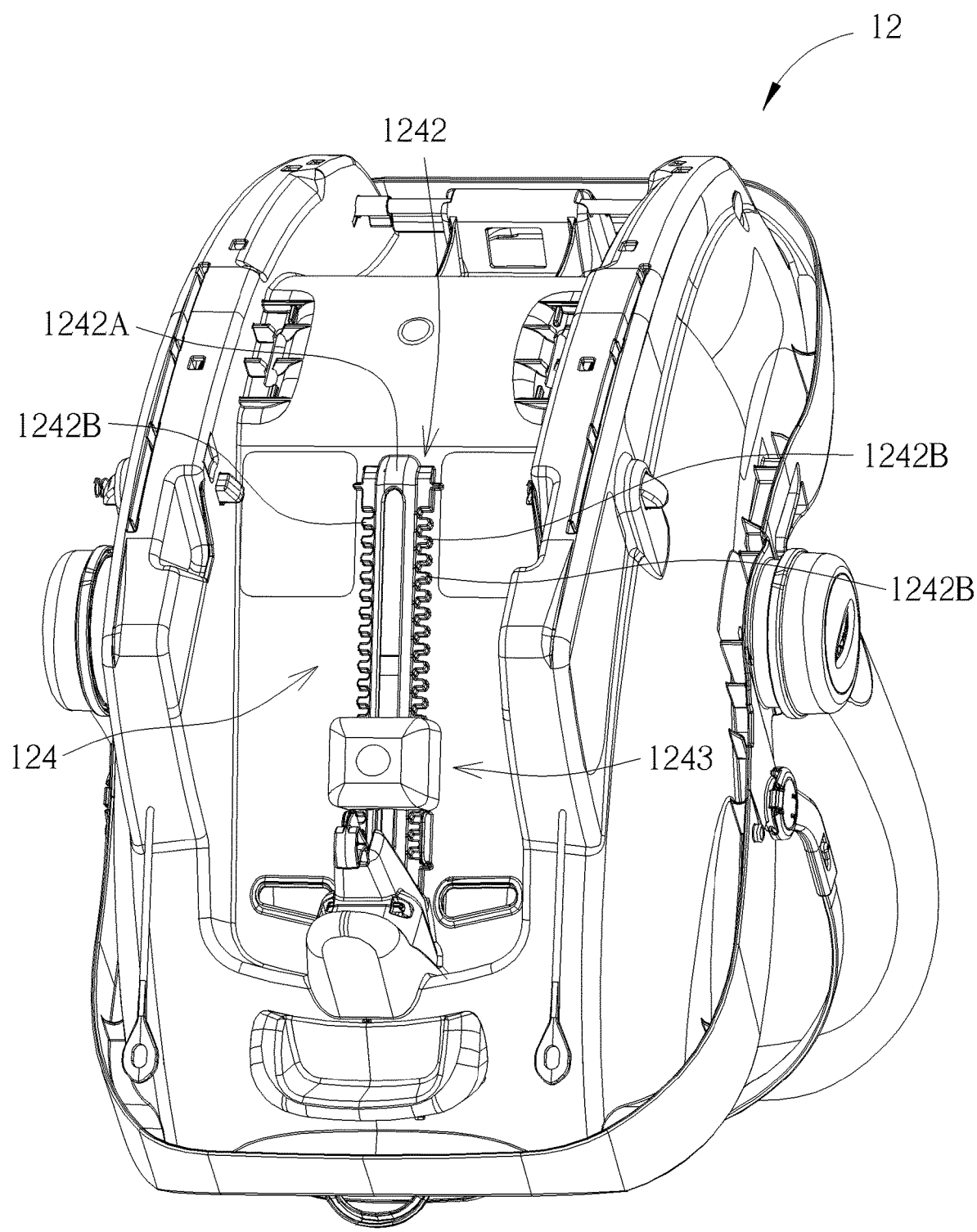
Figure 6:
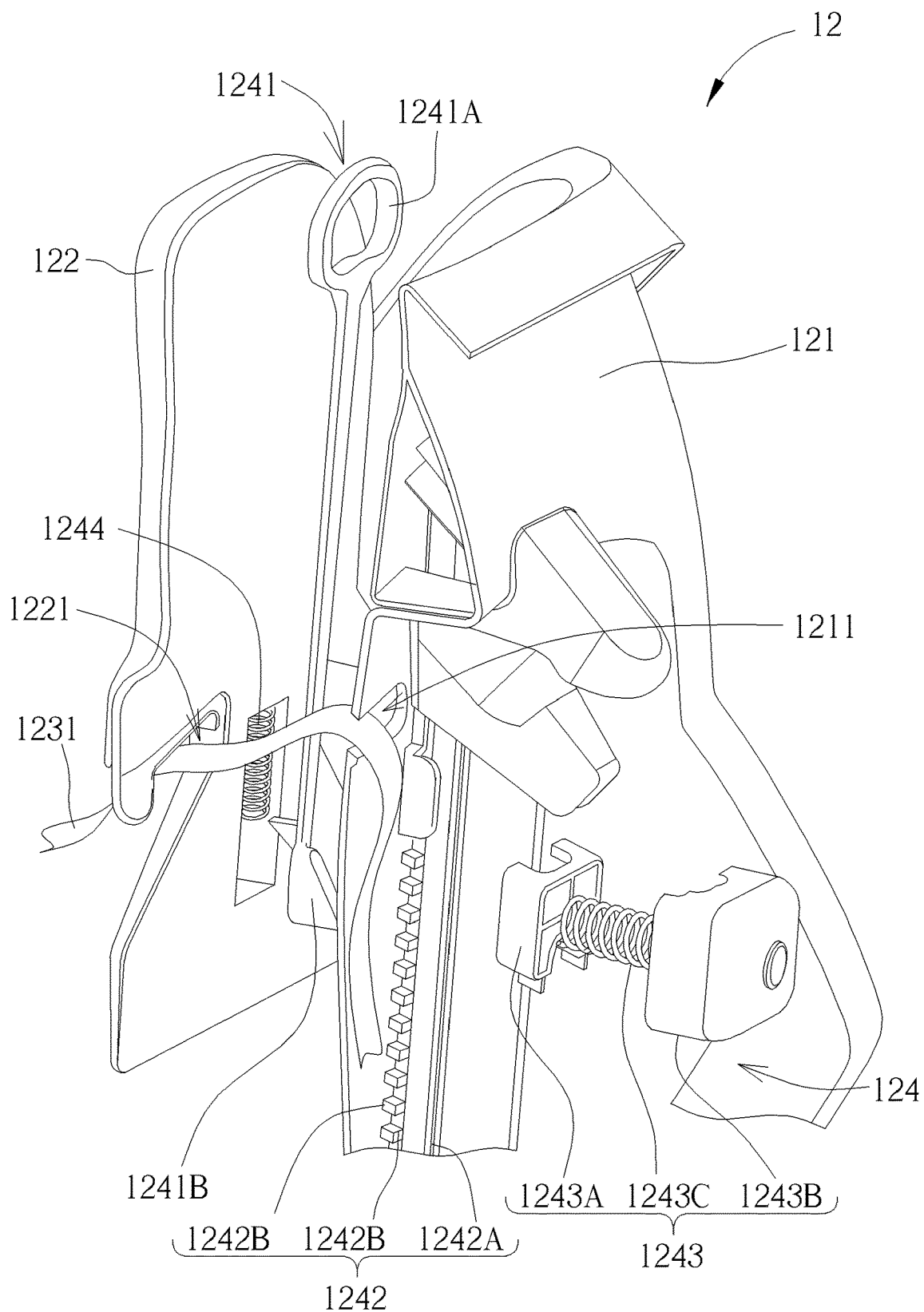
FIG. 6 is a partial exploded diagram of the child restraint carrier according to the embodiment of the present invention.
Figure 7:
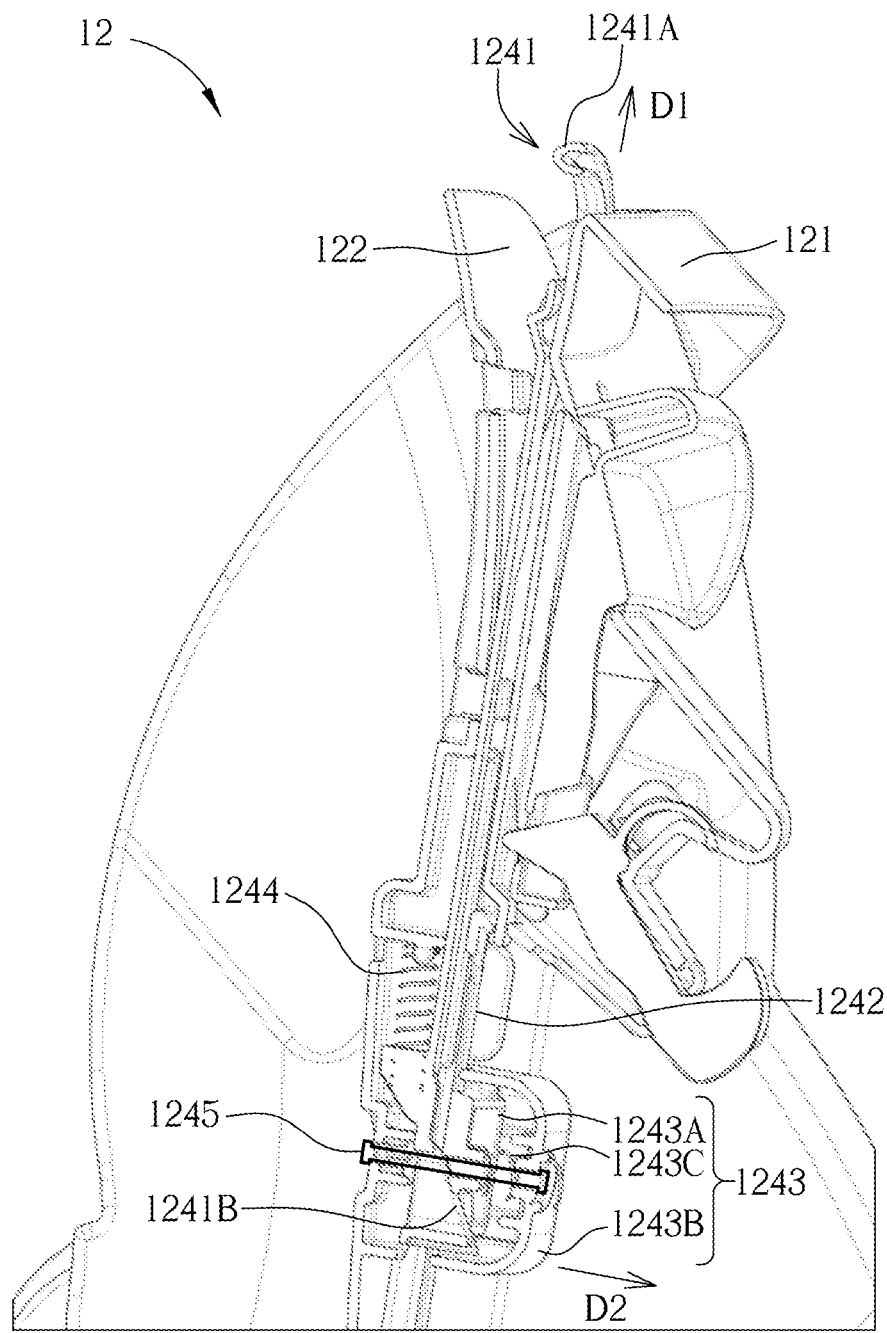
FIG. 7 is a partial internal structural diagram of the child restraint carrier according to the embodiment of the present invention.

Please refer to FIG. 4 to FIG. 7. FIG. 4 and FIG. 5 are partial diagrams of the child restraint carrier 12 at different views according to the embodiment of the present invention. FIG. 6 is a partial exploded diagram of the child restraint carrier 12 according to the embodiment of the present invention. FIG. 7 is a partial internal structural diagram of the child restraint carrier 12 according to the embodiment of the present invention. As shown in FIG. 4 to FIG. 7, the child restraint carrier 12 includes a seat body 121, a headrest 122 and a harness assembly 123. Two first slots 1211 are formed on the seat body 121. The headrest 122 is movably installed on the seat body 121. Two second slots 1221 are formed on the headrest 122. The harness assembly 123 includes two shoulder straps 1231. Each shoulder strap 1231 slidably passes through the corresponding first slot 1211 and the corresponding second slot 1221. Heights of the two shoulder straps 1231 can be adjusted by movement of the headrest 122 relative to the seat body 121 when the headrest 122 moves relative to the seat body 121.

Preferably, in this embodiment, the child restraint carrier further includes a locking mechanism 124 for allowing or restraining the movement of the headrest 122 relative to the seat body 121, which achieves a purpose of positioning the two shoulder straps 1231. The locking mechanism 124 includes a driving component 1241, a first engaging module 1242, a second engaging module 1243, and a recovering component 1244. The driving component 1241 is movably disposed on the headrest 122. The first engaging module 1242 is disposed on the seat body 121. The second engaging module 1243 abuts against the driving component 1241 for engaging with or disengaging from the first engaging module 1242. The driving component 1241 can be operated to drive the second engaging module 1243 to disengage from the first engaging module 1241 for allowing the movement of the headrest 122 relative to the seat body 1241. The recovering component 1244 abuts between the driving component 1241 and the headrest 122 to recover the driving component 1241 when the driving component 1241 is released Specifically, the driving component 1241 is partially located between the headrest 122 and the seat body 121 and includes a handle portion 1241A and an inclined protrusion 1241B. The inclined protrusion 1241B abuts against the second engaging module 1243 for driving the second engaging module 1243 to move away from and disengage from the first engaging module 1242, and the handle portion 1241A is exposed out of a top portion of the headrest 122 for allowing the user to operate.

Furthermore, the first engaging module 1242 and the second engaging module 1243 are located at a rear side of the seat body 121 away from the headrest 122. The first engaging module 1242 includes a guiding component 1242A and a plurality of first engaging components 1242B. The guiding component 1242A is for guiding the movement of the headrest 122 relative to the seat body 121. The plurality of first engaging components 1242B is disposed on the guiding component 1242A and located at two lateral sides of the guiding component 1242A for engaging with or disengaging from the second engaging module 1243. The second engaging module 1243 includes a second engaging component 1243A, a covering component 1243B and a resilient component 1243C. The second engaging component 1243A abuts against the inclined protrusion 1241B of the driving component 1241. The covering component 1243B covers the second engaging component 1243A. The resilient component 1243C abuts between the second engaging component 1243A and the covering component 1243B to bias the second engaging component 1243 to engage with one of the plurality of the first engaging components 1242B of the first engaging module 1242.

Preferably, in this embodiment, the guiding component 1242A can be a guiding sliding slot structure. The inclined protrusion 1241B passes the guiding sliding slot structure to abut against the second engaging component 1243A. The inclined protrusion 1241B moves along the guiding sliding slot structure when the headrest 122 moves relative to the seat body 121. The locking mechanism 124 can further include a rivet 1245 passing through the headrest 122, the driving component 1241, the guiding sliding slot structure, and the second engaging component 1243A, for connecting the headrest 122, the driving component 1241 and the second engaging component 1243A, so as to drive the second engaging component 1243A to move along the guiding sliding slot structure when the headrest 122 moves relative to the seat body 121. Furthermore, the first engaging component 1242B can be engaging teeth disposed along the guiding component 1242A, and the second engaging component 1243A can be an engaging pawl. However, it is not limited thereto.

When it is desired to adjust the shoulder straps 1231 to fit a child sitting in the child restraint carrier 12, the user only has to operate the handle portion 1241A of the driving component 1241 to move along a first direction D1 to drive the inclined protrusion 1241B to push the second engaging component 1243A to move along a second direction D2 perpendicular to the first direction D1, to disengage from the first engaging component 1242B for allowing the movement of the headrest 122 relative to the seat body 121 and resiliently deform the recovering component 1244 and the resilient component 1243C. Since each shoulder strap 1231 passes through the corresponding first slot 1211 and the corresponding second slot 1221, heights of the two second slots 1221 can be adjusted accordingly when the headrest 122 moves relative to the seat body 121, which achieves a purpose of adjusting the two shoulder straps 1231 to fit the child.

Besides, during the movement of the headrest 122 relative to the seat body 121, the guiding component 1242A can cooperate with the inclined protrusion 1241B and/or the second engaging component 1243A to guide the headrest 122 to move relative to the seat body 121 along a direction parallel to the first direction D1.

After adjustment of the two shoulder straps 1231 has been completed, the handle portion 1241A of the driving component 1241 can be released, so that the resiliently deformed recovering component 1244 and the resiliently deformed resilient component 1243C can respectively recover the inclined protrusion 1241B and the second engaging component 1243A resiliently to engage the second engaging component 1243A with another first engaging component 1242B for positioning the headrest 122 relative to the seat body 1221, which achieves the purpose of positioning the two shoulder straps 1231.

In contrast to the prior art, the present invention utilizes the first slot formed on the seat body and the second slot formed on the headrest for allowing the shoulder strap to slidably pass therethrough. Therefore, the height of the shoulder strap is adjusted by movement of the headrest relative to the seat body when the headrest moves relative to the seat body, which requires no disassembly of the child restraint carrier. Furthermore, the present invention further utilizes the notch formed on the top portion of the base body to provide access to the actuator when the child restraint base is installed on a vehicle, which requires no disconnection of a lower anchor or a vehicle belt. Therefore, the child restraint carrier and the child restraint system of the present invention have an advantage of easy adjustment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child restraint system comprising:
   a child restraint base; and
   a child restraint carrier detachably installed on the child restraint base, the child restraint carrier comprising:
      a seat body, at least one first slot being formed on the seat body;
      a headrest movably installed on the seat body, at least one second slot being formed on the headrest;
      a harness assembly comprising at least one shoulder strap, the at least one shoulder strap slidably passing through the at least one first slot and the at least one second slot, and a height of the at least one shoulder strap being adjusted by movement of the headrest relative to the seat body when the headrest moves relative to the seat body; and
      a locking mechanism for allowing or restraining the movement of the headrest relative to the seat body, the locking mechanism comprises:
         a driving component movably disposed on the headrest and movable along a first direction;
         a first engaging module disposed on the seat body; and
         a second engaging module abutting against the driving component and slidable along a second direction different from the first direction for engaging with or disengaging from the first engaging module, the driving component driving the second engaging module to slide along the second direction to disengage from the first engaging module for allowing the movement of the headrest relative to the seat body when the driving component is operated to move along the first direction.

2. The child restraint system of claim 1, wherein the driving component comprises an inclined protrusion abutting against the second engaging module, and the second engaging module is driven by the inclined protrusion to move away from the first engaging module for disengaging from the first engaging module when the driving component is operated.

3. The child restraint system of claim 2, wherein the driving component is partially located between the headrest and the seat body, the first engaging module and the second engaging module are located at a rear side of the seat body away from the headrest, and the inclined protrusion passes through the seat body to abut against the second engaging module.

4. The child restraint system of claim 1, wherein the first engaging module comprises:
   a guiding component for guiding the movement of the headrest relative to the seat body; and
   a plurality of first engaging components disposed on the guiding component for engaging with or disengaging from the second engaging module.

5. The child restraint system of claim 1, wherein the second engaging module comprises:
   a second engaging component abutting against the driving component;
   a covering component covering the second engaging component; and
   a resilient component abutting between the second engaging component and the covering component to bias the second engaging component to engage with the first engaging module.

6. The child restraint system of claim 1, wherein the locking mechanism further comprises a recovering component abutting between the driving component and the headrest to recover the driving component when the driving component is released.

7. The child restraint system of claim 1, wherein the driving component comprises a handle portion exposed out of a top portion of the headrest.

8. The child restraint system of claim 1, wherein the locking mechanism further comprises a rivet connecting the headrest, the driving component and the second engaging module.

9. The child restraint system of claim 1, wherein the child restraint base comprises:
   a base body, a notch being formed on a top portion of the base body;
   a reclining foot disposed on the base body and movable relative to the base body to adjust a reclined angle of the base body; and
   an actuator movably disposed on the base body and exposed from the notch, the actuator being switchable between a locking position and a releasing position for allowing or restraining movement of the reclining foot relative to the base body.

10. A child restraint carrier comprising:
    a seat body, at least one first slot being formed on the seat body;
    a headrest movably installed on the seat body, at least one second slot being formed on the headrest;
    a harness assembly comprising at least one shoulder strap, the at least one shoulder strap slidably passing through the at least one first slot and the at least one second slot, and a height of the at least one shoulder strap being adjusted by movement of the headrest relative to the seat body when the headrest moves relative to the seat body; and
    a locking mechanism for allowing or restraining the movement of the headrest relative to the seat body, the locking mechanism comprising:
       a driving component movably disposed on the headrest and movable along a first direction;
       a first engaging module disposed on the seat body; and
       a second engaging module abutting against the driving component and slidable along a second direction different from the first direction for engaging with or disengaging from the first engaging module, the driving component driving the second engaging module to slide along the second direction to disengage from the first engaging module for allowing the movement of the headrest relative to the seat body when the driving component is operated to move along the first direction.

11. The child restraint carrier of claim 10, wherein the driving component comprises an inclined protrusion abutting against the second engaging module, and the second engaging module is driven by the inclined protrusion to move away from the first engaging module for disengaging from the first engaging module when the driving component is operated.

12. The child restraint carrier of claim 11, wherein the driving component is partially located between the headrest and the seat body, the first engaging module and the second engaging module are located at a rear side of the seat body away from the headrest, and the inclined protrusion passes through the seat body to abut against the second engaging module.

13. The child restraint carrier of claim 10, wherein the first engaging module comprises:
a guiding component for guiding the movement of the headrest relative to the seat body; and
a plurality of first engaging components disposed on the guiding component for engaging with or disengaging from the second engaging module.

14. The child restraint carrier of claim 10, wherein the second engaging module comprises:
a second engaging component abutting against the driving component;
a covering component covering the second engaging component; and
a resilient component abutting between the second engaging component and the covering component to bias the second engaging component to engage with the first engaging module.

15. The child restraint carrier of claim 10, wherein the locking mechanism further comprises a recovering component abutting between the driving component and the headrest to recover the driving component when the driving component is released.

16. The child restraint carrier of claim 10, wherein the driving component comprises a handle portion exposed out of a top portion of the headrest.

17. The child restraint carrier of claim 10, wherein the locking mechanism further comprises a rivet connecting the headrest, the driving component and the second engaging module.

* * * * *